April 25, 1961 F. R. DICKINSON ET AL 2,981,454
MEANS FOR CONTINUOUSLY PASSING CABLE INCLUDING RIGID
HOUSINGS THROUGH A CATERPILLAR CABLE ENGINE
Filed June 18, 1958 4 Sheets-Sheet 1

INVENTORS F. R. DICKINSON
H. N. UPTHEGROVE
BY Stoddard

ATTORNEY

April 25, 1961  F. R. DICKINSON ET AL  2,981,454
MEANS FOR CONTINUOUSLY PASSING CABLE INCLUDING RIGID
HOUSINGS THROUGH A CATERPILLAR CABLE ENGINE
Filed June 18, 1958  4 Sheets-Sheet 2

INVENTORS F.R.DICKINSON
H.N.UPTHEGROVE
BY
ATTORNEY

April 25, 1961  F. R. DICKINSON ET AL  2,981,454
MEANS FOR CONTINUOUSLY PASSING CABLE INCLUDING RIGID
HOUSINGS THROUGH A CATERPILLAR CABLE ENGINE
Filed June 18, 1958  4 Sheets-Sheet 3

INVENTORS F. R. DICKINSON
H. N. UPTHEGROVE
BY
ATTORNEY

April 25, 1961  F. R. DICKINSON ET AL  2,981,454
MEANS FOR CONTINUOUSLY PASSING CABLE INCLUDING RIGID
HOUSINGS THROUGH A CATERPILLAR CABLE ENGINE
Filed June 18, 1958  4 Sheets-Sheet 4
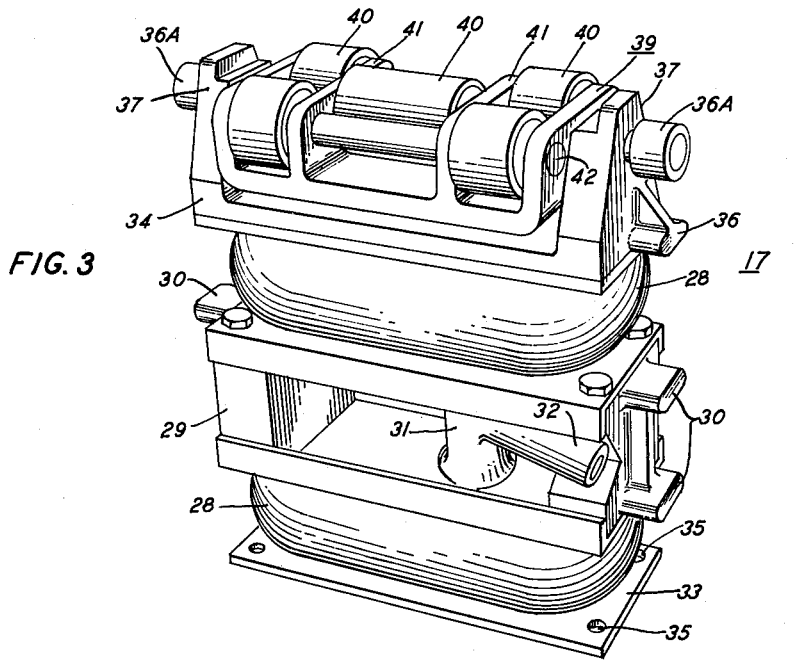
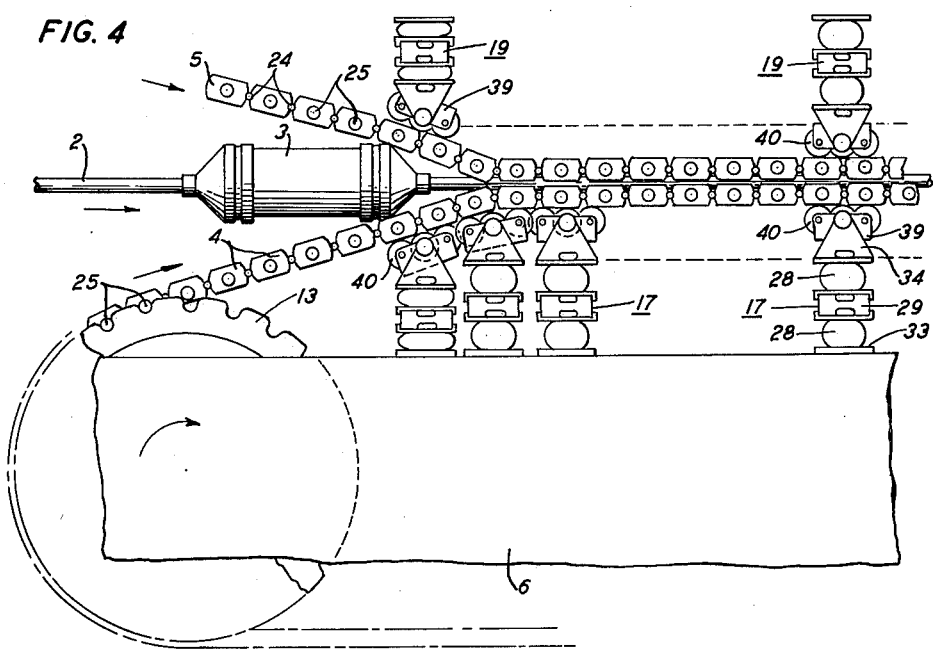
INVENTORS F.R. DICKINSON
H.N. UPTHEGROVE
BY
ATTORNEY United States Patent Office 2,981,454
Patented Apr. 25, 1961

2,981,454

MEANS FOR CONTINUOUSLY PASSING CABLE INCLUDING RIGID HOUSINGS THROUGH A CATERPILLAR CABLE ENGINE

Frank R. Dickinson, Glen Ridge, and Harry N. Upthegrove, Bernardsville, N.J., assignors to Bell Telephone Laboratories, Incorporated, New York, N.Y., a corporation of New York Filed June 18, 1958, Ser. No. 742,863

1 Claim. (Cl. 226—172)

This invention relates to a method of, and means for, continuously passing cable including rigid housings through a caterpillar cable engine. The invention is applicable to various types of cables and, although it may be used with armored cable, it is especially suitable for use with armorless cable. The invention is particularly useful when it is applied to the laying of underwater or undersea communication cable which is also known as submarine cable or ocean cable.

In laying a long undersea cable, such as a transatlantic telephone cable extending for a distance of about 3000 miles, the customary procedure is to fabricate the cable in long sections each having a length of around 200 miles. These long cable sections, known as "ocean blocks," are stowed in the hold of a cable-laying ship which carries them to the points where they are to be laid. At these points, an end of an ocean block of cable which is being carried by the ship is joined to the buoyed end of a cable section which has been previously laid on the bottom of the ocean. After this has been done, the ship proceeds on its course with the cable being pulled from the hold onto the deck where it is payed out into the ocean.

One method of transferring the cable from the ship's hold into the ocean utilizes a drum around which the cable is wrapped several times. This method of laying the cable has been satisfactory when it has been applied to armored cable. However, if this method were to be applied to armorless cable having an outer covering of a suitable plastic material, such as polyethylene, there would be the hazard that the plastic outer coating might not be able to withstand the concentrated radial strain imposed by the drum and might become cracked. Furthermore, if the cable should be of the coaxial type, there would be the additional danger that the force exerted by the conveyor drum might deform the concentric conductors and thereby produce impedance discontinuities.

Therefore, it is desirable that shipboard handling of armorless cable be performed by a caterpillar cable engine having a multiplicity of oppositely disposed gripper blocks arranged in lower and upper endless track formations. Thus, the total gripping force exerted by the cable engine is distributed over the individual gripper blocks so that the gripping area of each block is responsible for only a fraction of the total force. A further advantage of this engine is that it imposes no bending force because the cable passes through it along a path of travel which is essentially a straight line.

As is well known in the art, a long undersea telephone cable is usually provided with integral lumps at spaced intervals along its length. These lumps are constituted by housing structures which may be of either flexible or rigid construction and which contain electrical equipment, such as repeaters or equalizers. The spacing between these lump-type repeaters varies with the frequency bandwidth of the electrical signaling waves transmitted over a particular cable. This is due to the fact that an increase in the frequency bandwidth of the signaling waves produces an increase in the energy loss over a given distance thereby necessitating a reduction in the spacing between the repeaters. For example, in the past, the signaling frequencies have been such that a repeater spacing of around fifty miles has been adequate, but, in a recently developed broadband undersea telephone cable system having signaling frequencies in the order of one megacycle, a repeater spacing of about ten miles is required.

Heretofore, when undersea cable having a repeater spacing in the order of fifty miles was being laid by means of either a drum or a caterpillar engine, the cable-laying operations were temporarily suspended whenever a rigid repeater was to be laid. This was due to the fact that the repeaters were too large to pass either around the drum or to be fed through the caterpillar engine. Accordingly, one method that has been utilized in laying a repeater comprised stopping the progress of the cable-laying ship and also stopping the drum or caterpillar engine. The cable and its repeater were then guided by several men overboard into the ocean. It was then necessary either to rewind the cable around the drum or to grasp it again with the caterpillar engine before the ship could proceed on its course.

This method of laying repeaters possesses several objectionable features. Firstly, it imposes extra labor upon the personnel carried by the ship. Secondly, considerable time is consumed in stopping the cable-laying ship on each occasion that a repeater is laid. Thirdly, when the cable-laying process is halted for any substantial period of time, kinks are liable to form in that portion of the cable extending from the ship to the bottom of the ocean. It can be understood that this last-mentioned hazard is particularly liable to occur when the cable-laying operations are taking place in water that is several miles deep. These objectionable features would become multiplied fivefold if cable having a repeater spacing of around ten miles should be laid in the manner described above.

Accordingly, it is an object of this invention to provide an improved cable-handling facility which will operate continuously at normal cable-handling speeds on both a cable and its integral lump-type housing structures.

Another object of this invention is to provide a caterpillar cable engine with means for "swallowing" or encompassing both a cable and its integral lump-type housing members while continuously operating at normal cable-handling speeds.

An additional object of the invention is to provide the gripper blocks of a caterpillar cable engine with a multiplicity of vertically displaceable discrete loading means having directionally flexible load transfer means.

These and other objects of the invention are accomplished in an improved caterpillar cable engine by providing both mating portions of its oppositely disposed upper and lower track formations of gripping units with a multiplicity of discrete loading units which are individually mounted in such a manner that each unit can be vertically displaced independently of each other unit by an amount which is substantially equal to the radius of the housing structures. In one embodiment of the invention, each loading unit comprises a plurality of short air springs. Directional flexibility of the force exerted by these loading units is obtained by supplying each of them with pivoted load transfer means. Each of these load transfer means comprises a truck and roller structure as is described in detail hereinafter.

During the operation of this improved cable-handling facility, when one of the lump-type housing members that is integral with the cable arrives at the input end of the caterpillar engine, it forces apart only the immediately adjacent oppositely disposed gripping units and, as it progresses further, becomes "swallowed" or engulfed inside the engine. After passing through the interior portion of the caterpillar engine, the repeater is "disgorged" or ejected at the output end of the engine. It is to be noted that, during the passage of the repeater through the engine, complete control of the cable is continuously maintained by the mating of the gripper blocks both immediately preceding and immediately following the repeater as it travels through the engine at normal cable-handling speeds. This is due in part to the use of the above-mentioned multiplicity of vertically displaceable discrete loading units and their directionally flexible load transfer means as is more fully discussed hereinafter. Thus, the caterpillar cable engine is able to operate continuously upon the cable and its integral lump-type housing members at normal cable-laying speeds without any interruption in the continuity of the laying process.

These and other features of the invention are more fully discussed in connection with the following detailed description of the drawing in which:

Fig. 3 is a three-dimensional view of one of the loading units and its directionally flexible load transfer means;

Fig. 4 is a schematic representation of a portion of the caterpillar cable engine showing one of the lump-type integral housing members entering the engine;

Figure 1:
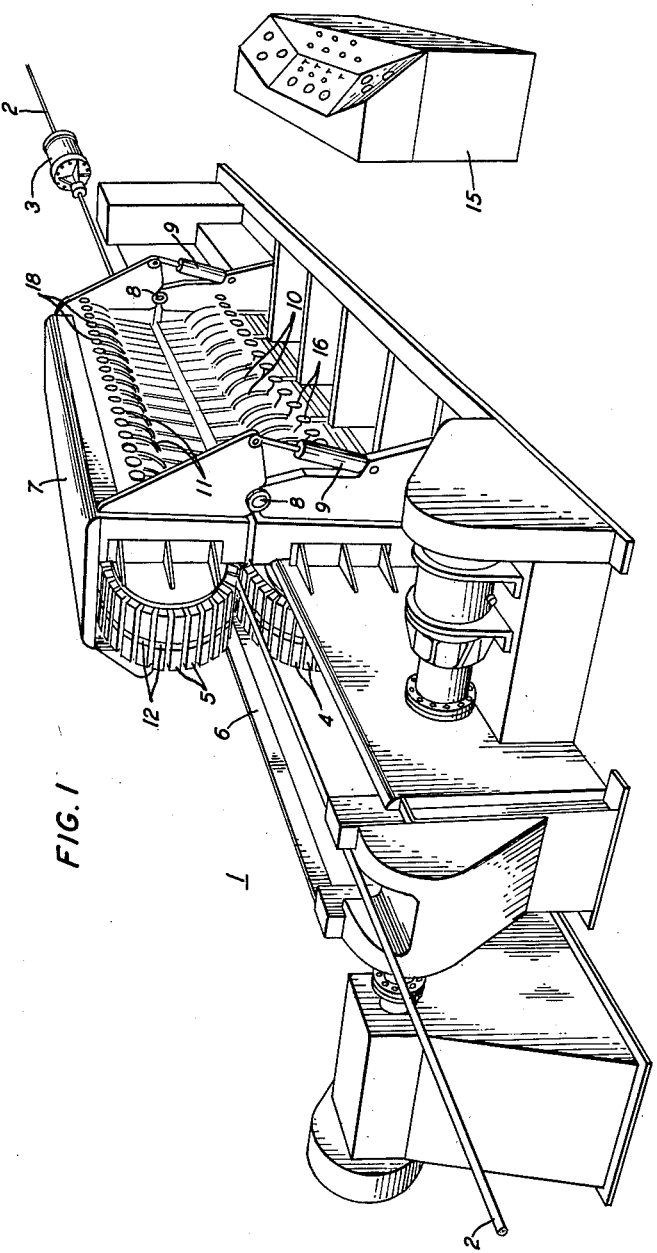
Fig. 1 is a perspective view of an improved caterpillar cable engine operating in accordance with this invention upon a cable having integral lump-type rigid housing members.

In Fig. 1, a caterpillar cable-handling engine 1 is shown to be operating upon a cable 2 having integral lump-type rigid instrumentality housing members 3 of a markedly greater diameter than that of the cable 2. In the particular embodiment of the invention illustrated in the drawing, the cable 2 is of the coaxial armorless type having an outer coating of a suitable plastic material, such as polyethylene. The outside diameter of the cable 2 is about one and one-quarter inches. The rigid instrumentality housing structures 3 contain electrical equipment, such as repeaters or equalizers, and are fabricated of appropriate material, such as beryllium copper. Each of the housing structures 3 has a length of the order of four feet and an outside diameter of about one foot.

As is indicated in the drawing, the engine 1 is provided with a first multiplicity of gripper blocks 4 connected in a lower endless track formation and a second multiplicity of gripper blocks 5 arranged in an upper endless track formation. These lower and upper track formations of gripper blocks 4 and 5 are oppositely disposed with respect to each other with the lower assembly of gripper blocks 4 being mounted within a steel chassis structure 6 and the upper group of gripper blocks 5 being retained within another steel body structure 7. The upper body structure 7 is pivotally attached to the lower chassis structure 6 by means of hinges 8 so that it can be moved upward in order to provide access to the interior of the engine 1. Due to the weight of the upper body structure 7, two power-operated jacks 9 are provided for effecting its movement.

The cable 2 passes through the engine 1 by traveling a distance of about twenty feet between the two track formations of gripping units 4 and 5. Each of the gripper blocks 4 and 5 is formed with a groove 12 therein for pressure equalization and also for maintaining the centering of the cable 2 during its travel through the engine 1. Control of the movement of the cable 2 is effected by the gripping action of the blocks 4 and 5 which have their respective track formations driven or restrained by large sprocket wheels, such as the sprocket wheel 13 shown in Fig. 4 and the sprocket wheel 14 shown in Fig. 5. The engine 1 may be operated by any suitable source of power, such as an hydraulic system driven by electric motors. This power source is designed to function as a drive motor in one direction for recovery operations and as a pump in the other direction for use as a brake during laying operations. The power source is further arranged to act as a drive motor in the laying direction for the purpose of pulling cable from the ship's hold until sufficient cable has been overboarded to pull its own weight. A control console 15 is associated with the engine 1 for providing a convenient location for the various instrumentalities which are used in controlling the operation of the engine 1.

The degree of the gripping action of the blocks 4 and 5 is regulated by adjustment of a pressurized air manifold system 16 connected by a group of flexible hoses 10 to a multiplicity of discrete pneumatic loading units 17 associated with the lower track formation of blocks 4, and also by adjustment of another pressurized air manifold system 18 connected by another group of flexible hoses 11 to a second multiplicity of discrete pneumatic loading units 19 associated with the upper track formation of blocks 5. The pneumatic loading units 17 and 19 are shown in various parts of the drawing, such as in Fig. 4. In this embodiment of the invention, the pneumatic loading units 17 and 19 are fixedly located and are constituted by short air springs which are assembled in pairs as is described in detail hereinafter. The manner in which these loading units 17 and 19 are associated with the oppositely disposed lower and upper track formations of gripper blocks 4 and 5 is illustrated in Fig. 2.

Figure 2:
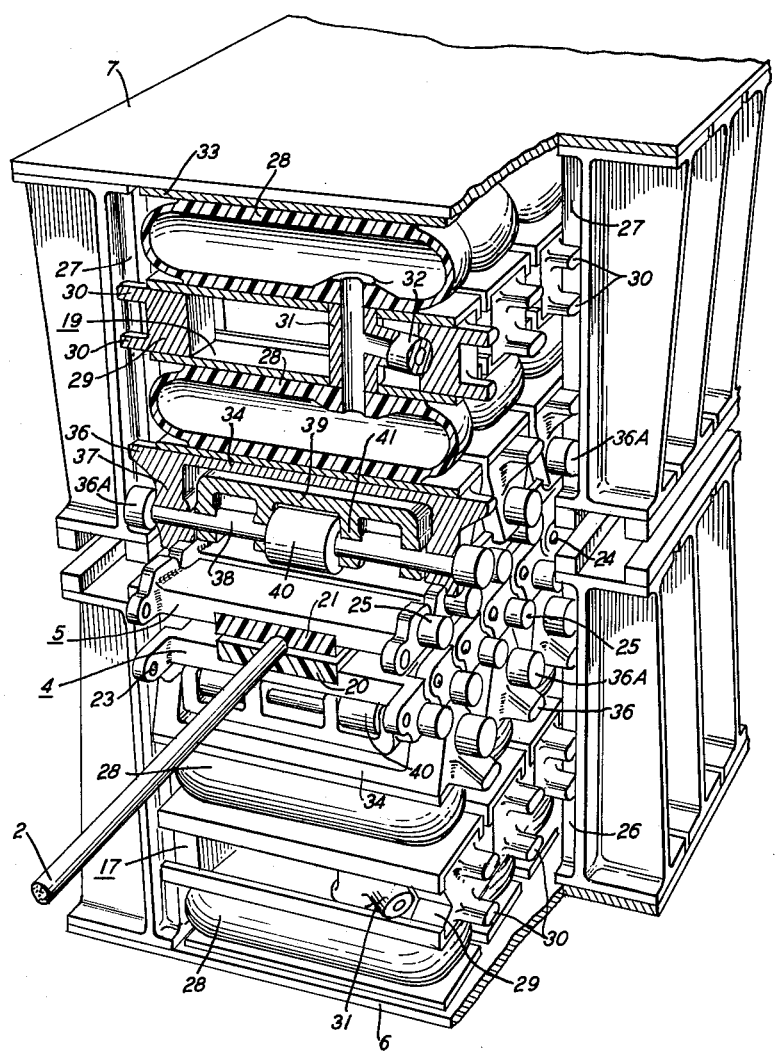
Fig. 2 is a three-dimensional view partly in section of a portion of the caterpillar cable engine showing the manner in which the oppositely disposed lower and upper tracks of the caterpillar engine are provided with vertically displaceable discrete loading units having load transfer means which are directionally flexible.
Figure 2A:
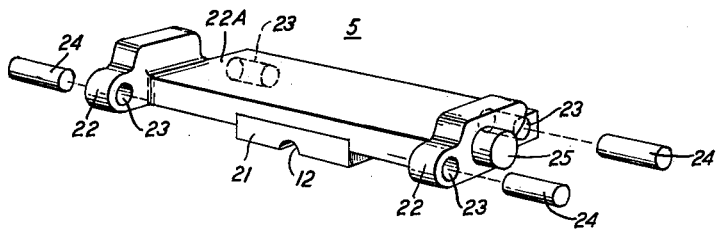
Fig. 2A is a three-dimensional view of one of the gripper blocks in the upper caterpillar track.

In Fig. 2, the cable 2 is represented as being held between a lower gripper block 4 and an upper gripper block 5. The blocks 4 and 5 comprise aluminum castings having molded rubber inserts 20 and 21. Each of the rubber inserts 20 and 21 is formed with a groove 12 in its face, as is also shown in Fig. 2A, for mating with the contour of the cable 2. These grooves 12 perform two functions. Firstly, they aid in maintaining the centering of the cable 2 during its passage through the engine 1. Secondly, they assist in equalizing the contact pressure exerted by the blocks 4 and 5 in a direction normal to the cable 2 thereby lessening the possibility of this armorless cable 2 becoming damaged while traveling through the engine 1.

In order to join the gripper blocks 4 and 5 into lower and upper endless track formations, each end of the blocks 4 and 5 is formed with an integral link portion 22 and a recessed portion 22A as is best seen in Fig. 2A. These portions 22 and 22A are each provided with a hole 23 therein for receiving a steel link or hinge pin 24. Each link portion 22 is so shaped as to overlap and to mate with a recessed portion 22A of an adjacent gripper block in the same track formation in such a manner that their holes 23 will be in alignment. Due to this overlapping and mating arrangement, each hinge pin 24 passes through a hole 23 in each of two adjacent gripper blocks thereby pivotally joining them. Thus, by means of this construction all of the lower gripper blocks 4 are connected into one endless track formation and all of the upper gripper blocks 5 are connected into another endless track formation.

Figure 5:
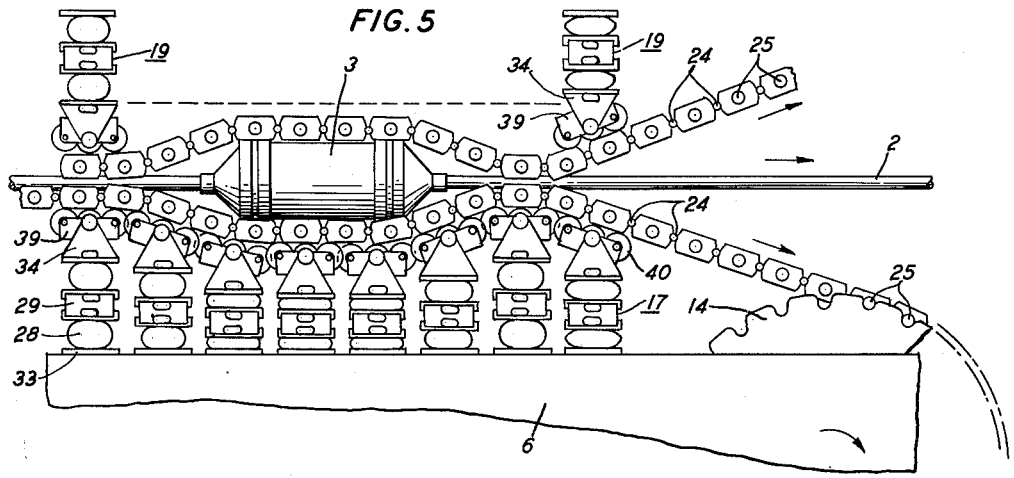
Fig. 5 is another schematic representation of a portion of the cable-handling engine showing one of the housing structures being "swallowed" or encompassed by the engine.

As was stated above, the lower and upper endless track formations of gripper blocks 4 and 5 are driven by large sprocket wheels, such as the sprocket wheel 13 shown in Fig. 4 and the sprocket wheel 14 shown in Fig. 5. This is accomplished by mounting a pin or stud 25 at each end of each gripper block 4 or 5. These pins 25 are of such a size as to enable them to fit between the teeth of the sprocket wheels in the manner represented in Figs. 4 and 5. For the purpose of simplifying the drawing, only the sprocket wheels 13 and 14 associated with one side of the lower track formation of gripper blocks 4 have been shown in Figs. 4 and 5. It is to be understood that two similar sprocket wheels are associated with the other side of the lower track formation of blocks 4 for co-acting with the pins 25 projecting therefrom. It is to be further understood that the upper track formation of gripper blocks 5 is driven in a comparable manner by four other sprocket wheels which are similar to the sprocket wheels 13 and 14.

In order to enable the caterpillar cable engine 1 to be used either for laying cable or for recovering cable that has been previously laid, the power supply for the engine 1 is so designed that the direction of rotation of the above-mentioned sprocket wheels can be reversed by manually operating appropriate control switches mounted in the control console 15. Due to this arrangement, the lower and upper track formations of gripper blocks 4 and 5 can be driven in either a forward or a reverse direction. For example, at the start of the laying of a cable section, its front portion is pulled from the ship's hold by driving the sprocket wheels in a clockwise direction, as is indicated in Figs. 4 and 5, thereby causing the lower and upper caterpillar tracks to be driven in the direction of the arrows shown in Figs. 4 and 5. After a sufficient length of cable has been overboarded to pull its own weight, a plurality of selector valves are operated from the control console 15 for causing the power system to cease functioning as a drive motor in that direction and to operate as a pump in the other direction for use as a brake during subsequent passage of the cable 2 through the engine 1. When it is desired to recover cable that has been previously laid, proper operation of the selector valves will cause the power system to function as a drive motor for driving the sprocket wheels in a counterclockwise direction so that the lower and upper caterpillar tracks will be driven in a direction opposite to that in which the arrows of Figs. 4 and 5 are pointing.

During the movement of the lower and upper caterpillar tracks, the gripping action of the blocks 4 and 5 is continuously maintained by pressure produced by the above-mentioned pneumatic loading units 17 and 19, the lower units 17 being mounted beneath the lower track formation of blocks 4 on the lower steel chassis structure 6 and the upper units 19 being retained above the upper track formation of blocks 5 by the upper body structure 7. At this point, the construction of the pneumatic loading units 17 and 19 will be explained with particular reference to Fig. 3 which illustrates one of the lower loading units 17 that is typical of all of the loading units 17 and 19.

In Fig. 3, the loading unit 17 is shown to comprise two short air springs 28 of any appropriate material, such as a combination of rubber and fabric. The air springs 28 are suitably mounted in tandem on a metallic spacing member 29 having two protuberances or studs 30 projecting from each of its ends. The studs 30 are so constructed as to slide up and down in vertical channels 26 formed in the lower chassis structure 6 as is shown in Fig. 2. Thus, the studs 30 function as stabilizing or aligning guides during the alternate periods of compression and expansion of the air springs 28 that are caused by the passage of a repeater 3 through the engine 1 as is more fully discussed hereinafter. The two air springs 28 are interconnected by a hollow member 31 which is mounted within the spacing member 29. This interconnecting member 31 is T-shaped in order to provide a convenient input termination 32 for connection to one of the flexible hoses 10 in the lower air manifold system 16 which is shown in Fig. 1. It is to be understood that the air springs 28 in the upper loading units 19 are connected in a similar manner to the flexible hoses 11 of the upper air manifold system 18.

The loading force applied to the cable 2 by the air springs 28 in the lower and upper loading units 17 and 19 can be varied as desired by changing the pressure of the air supplied through the lower and upper manifold systems 16 and 18. For example, in one embodiment of the invention, the manifold systems 16 and 18 were adjusted to provide a pressure of about twenty pounds per square inch in each of the air springs 28.

When a repeater 3 passes through the engine 1, it causes each group of air springs 28 to become compressed in sequence as is described in detail hereinafter. In other words, due to their resilient construction, the loading units 17 and 19 will become vertically displaced by an amount sufficient to permit the passage of the repeater 3. Thus, if the diameter of the repeater 3 is one foot, then each of the air springs 28 in the lower and upper loading units 17 and 19 should be capable of a compressional displacement of three inches.

In Fig. 3, it can be seen that, in addition to being mounted upon the spacing member 29, the lower air spring 28 is also mounted upon a flat metallic plate 33 while the upper air spring 28 supports a saddle member 34. The plate 33 is provided with holes 35 near its corners so that it can be bolted to the lower chassis structure 6 for the purpose of preventing the position of the loading unit 17 from being shifted laterally, such as might otherwise occur during the passage of a repeater 3 through the engine 1. Each end of the saddle member 34 is provided with a protuberance or stud 36 and a roller 36A projecting therefrom and so constructed as to slide up and down in the above-mentioned vertical channels 26. Thus, the studs 36 and the rollers 36A assist the studs 30 in aligning and stabilizing the loading unit 17 during its downward and upward motion resulting from compression and expansion of the air springs 28.

The saddle 34 is formed with lugs 37 at each end for receiving a pivot shaft 38 which supports a truck member 39 in such a manner that it can tilt or rock back and forth. The truck member 39 carries a plurality of rollers 40 which are rotatably mounted thereon in such a manner as to bear against the lower track formation of gripper blocks 4, as is indicated in Fig. 2. Due to this construction, the loading force exerted by the lower and upper air springs 28 in the lower loading unit 17 is transferred by the rollers 40 to the lower gripper blocks 4 thereby producing a gripping action upon the cable 2. In other words, the truck 39 and its assembly of rollers 40 constitute pivoted load transfer means for providing directional flexibility in the application of the loading force to the lower track formation of gripper blocks 4. This is of particular utility during the passage of a repeater 3 through the engine 1 because it assists in causing the track to conform to the contour of the repeater 3 as is more fully discussed hereinafter.

For the purpose of effecting an evenly distributed transference of the loading force produced by the loading units 17 and 19, it is preferable to mount a number of rollers 40 on each truck 39 instead of merely one or two rollers. Accordingly, each truck 39 is formed with two intermediate lugs 41 for separating the rollers 40 into three groups. In Fig 3, it can be seen that two short rollers 40 are rotatably mounted on shafts 42 between the left end of the truck 39 and the first lug 41; one long roller 40 is rotatably mounted on the pivot shaft 38 between the two lugs 41; and two other short rollers 40 are rotatably mounted on the shafts 42 between the right end of the truck 39 and the second lug 41. All of the rollers 40 have the same diameter, but the length of the long roller 40 is equal to the combined lengths of two of the short rollers 40.

In order for the rollers 40 of one loading unit 17 to be mounted as closely as possible to corresponding rollers 40 in an adjacent loading unit 17, the rollers 40 of the adjacent loading unit 17 are mounted on their truck 39 in a manner different from that described above. This mounting arrangement is illustrated in Fig. 6 which shows schematically some of the trucks 39 and their rollers 40.

Figure 6:
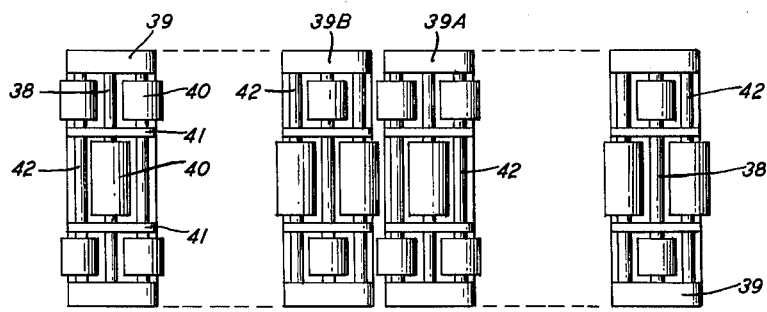
Fig. 6 is a top view of some of the trucks and rollers that are a part of the directionally flexible load transfer means associated with the loading units.

In Fig. 6, one of the trucks, which is designated 39A, has its rollers 40 disposed in the manner shown in Fig. 3 and described above. The adjacent truck, which is designated 39B, has its rollers 40 differently arranged in that each of its end sections has one short roller 40 rotatably mounted on its pivot shaft 38 while its middle section has two long rollers 40 which are each rotatably mounted on a respectively different one of its shafts 42. For the purpose of simplicity, the other trucks 39 which are immediately adjacent to the trucks 39A and 39B have not been shown in Fig. 6. However, it is to be understood that the truck which is adjacent to the left side of the truck 39B has its rollers mounted in the same manner as those carried by the truck 39A while the truck adjacent to the right side of the truck 39A has its rollers disposed in the same fashion as those on the truck 39B.

As is shown in Fig. 6, each of the long rollers 40 is spaced apart from the next long roller 40 by either a pivot shaft 38 or a shaft 42, and each of the short rollers 40 is similarly separated from the next short roller 40 by either a pivot shaft 38 or a shaft 42. The diameter of one of the pivot shafts 38 is equal to the diameter of one of the shafts 42 but these diameters are considerably smaller than the diameter of one of the rollers 40. This difference in diameters together with the close spacing of the rollers 40 causes a certain amount of longitudinal overlapping of the short rollers 40 with the long rollers 40 which produces an overall semi-interlocking effect. Due to this arrangement of the rollers 40, each of the gripper blocks 4 that is positioned above the loading units 17 will be constantly in contact with more than one line of the rollers 40 so that the loading force will be evenly distributed or transferred thereto.

A similar arrangement of rollers 40 is pressed against the top surface of the upper track formation of gripper blocks 5 by the upper loading units 19. Each of the upper loading units 19 has its lower air spring 28 mounted upon a similar saddle 34 having a duplicate roller-carrying truck 39 pivotally attached thereto. These upper saddles 34 and trucks 39 are provided with studs 30 and 36 and rollers 36A which are slidably retained by vertical channels 27 formed in the upper body structure 7.

Also, in each of the upper loading units 17, the upper air spring 28 is mounted upon a similar plate 33 which is bolted to the upper body structure 7 as is indicated in Fig. 2. In one embodiment of the invention, eighteen of these upper loading units 19 were positioned over eighteen of the lower loading units 17 along the mating portions of the lower and upper caterpillar track formations of gripper blocks 4 and 5.

In operating the caterpillar cable engine 1, the first step is to insert the cable 2 into the engine 1. If the end of the cable 2 is not accessible for being threaded into the engine 1, then the cable 2 can be inserted by operating the hydraulic jacks 9 which are electrically controlled from the control console 15 and which cause the upper body structure 7 to swing open on the hinges 8. In this manner, access to the interior of the engine 1 is readily obtained. The cable 2 is then manually laid in the grooves 12 of the lower gripper blocks 4. The jacks 9 are next operated to return the upper body structure 7 to its normal position so that the upper gripper blocks 5 will engage the cable 2. Driving power is now applied to the sprocket wheels, represented by the sprocket wheels 13 and 14, for translating the lower and upper mating track formations of gripper blocks 4 and 5 concurrently in the same direction. Sufficient normal force is applied in increments along the tracks by the lower and upper loading units 17 and 19 to maintain the tracks in gripping relation with the cable 2.

When one of the rigid instrumentality housings 3, which may be a repeater, enters the engine 1 at appropriate intervals during the passage of the cable 2, the housing 3 will force apart only the immediately adjacent lower and upper gripper blocks 4 and 5 as is illustrated in Fig. 4. It can be seen in Fig. 4 that, when the repeater 3 forces gripper blocks 4 and 5 apart, it also causes the first pair of lower and upper loading units 17 and 19 to become vertically displaced. This vertical displacement of the loading units 17 and 19 is made possible by the compression of their respectively associated pairs of air springs 28. At the same time, the directional flexibility of the first pair of pivotally mounted trucks 39 enables them to tilt about their pivot shafts 38 in the manner shown in Fig. 4 so as to conform to the contour of the repeater 3. This rocking or swinging action of the trucks 39 serves to hold all of their rollers 40 in contact with their respectively associated gripper blocks 4 and 5 without relaxing the loading pressure.

After the housing member 3 travels further inside the engine 1, it causes more of the adjacent individual loading units 17 and 19 to become vertically displaced so that it becomes "swallowed" or enveloped by the lower and upper gripper blocks 4 and 5 as is represented in Fig. 5. Finally, at the output end of the engine 1, the housing member 3 is "disgorged" or expelled in a manner which is the converse of its entry into the engine 1. In this way, the housing structure 3 passes through the engine 1 at normal cable-laying speed which may, for example, be eight knots.

It is to be noted that the directional flexibility of the pivotally mounted trucks 39 enables them to adapt themselves to the contour of the housing member 3 without relaxing the load imposed by the air springs 28. This causes all of their rollers 40 to exert pressure constantly over the surfaces of the gripper blocks 4 and 5. Thus, the cable 2 is continuously gripped by the blocks 4 and 5 both immediately preceding and immediately following the repeater 3. In other words, the control exercised by the cable-handling engine 1 upon the cable 2 is sustained at normal cable-handling speeds during the passage of the repeater 3 through the engine 1 due to the fact that this cable-handling method comprises separating successive portions only of the mating tracks as a rigid housing 3 passes therebetween while maintaining the remaining portions of the mating tracks in gripping relation with the cable 2.

It is to be understood that this invention has been described above with reference to a specific cable-handling engine for the purpose of explaining the principles and features of operation of the invention. It is to be further understood that the invention is not to be restricted to this particular embodiment as various modifications may be made without exceeding the scope of the invention. For example, each loading unit may comprise a smaller or larger number of air springs or some other kind of resilient means, such as metallic springs. Also, one group of loading units, such as the lower loading units 17, could be omitted provided the other group of loading units, such as the upper loading units 19, is so constructed and arranged as to be capable of a compressional displacement substantially equal to the diameter of the housing member 3. Various other types of directionally flexible load transfer means may be employed if desired.

What is claimed is:

In a caterpillar cable engine having a pair of concurrently translated mating tracks for handling a cable provided at spaced intervals with rigid instrumentality housings of a markedly greater radius than that of the cable, means for effecting the continuous passage at normal cable-handling speeds through said engine of said cable and its housings while maintaining continuous control of said cable, said means comprising a multiplicity of discrete loading units for applying sufficient normal force in increments along each of said tracks to maintain said tracks in gripping relation with said cable, each of said loading units comprising a metallic spacing member individual thereto, each of said loading units also having two separate resilient air bags of flexible material mounted in tandem on opposite sides of the respectively associated spacing member, and each of said loading units further including a hollow T-shaped member disposed inside the respective associated spacing member with its branching ends protruding therethrough on opposite sides thereof and extending into said air bags for interconnecting the respectively associated pair of air bags, each pair of said air bags being so constructed and arranged as to have a total compressional displacement at least equal to said housing radius.

References Cited in the file of this patent

UNITED STATES PATENTS

| | | |
|---|---|---|
| 1,703,777 | Pernot | Feb. 26, 1929 |
| 2,254,860 | Rose | Sept. 2, 1941 |
| 2,797,798 | Hallden | July 2, 1957 |
| 2,935,178 | Lutcke | May 3, 1960 |

FOREIGN PATENTS

| | | |
|---|---|---|
| 1,103,496 | France | May 25, 1955 |
| 636,595 | Germany | Oct. 12, 1936 |